United States Patent [19]

Foster

[11] Patent Number: 4,579,575

[45] Date of Patent: Apr. 1, 1986

[54] BLOW HEAD SUPPORTING AND MOVING MECHANISM OF A GLASSWARE FORMING MACHINE

[75] Inventor: Thomas V. Foster, Cantley, England

[73] Assignee: Emhart Industries, Inc., Farmington, Conn.

[21] Appl. No.: 433,139

[22] PCT Filed: Feb. 22, 1982

[86] PCT No.: PCT/GB82/00045

§ 371 Date: Sep. 30, 1982

§ 102(e) Date: Sep. 30, 1982

[87] PCT Pub. No.: WO82/02879

PCT Pub. Date: Sep. 2, 1982

[30] Foreign Application Priority Data

Feb. 27, 1981 [GB] United Kingdom ................. 8106255

[51] Int. Cl.4 ................................................ C03B 9/36

[52] U.S. Cl. ........................................ 65/261; 65/264; 65/300

[58] Field of Search ................. 65/301, 300, 261, 264, 65/265

[56] References Cited

U.S. PATENT DOCUMENTS

| | | | |
|---|---|---|---|
| 899,795 | 9/1908 | Osmer | 92/85 B |
| 1,911,119 | 5/1938 | Ingle | 5/310 |
| 2,329,012 | 9/1943 | Stewart et al. | 65/300 X |
| 2,783,591 | 3/1957 | Johnson | 65/260 |
| 2,826,176 | 3/1958 | Chellis et al. | 92/85 |
| 3,150,562 | 9/1964 | Allgeyer | 91/26 |
| 3,220,566 | 11/1965 | Rowe | 214/1 |
| 3,630,709 | 7/1969 | Irwin | 65/261 |
| 4,004,905 | 1/1977 | Mumford | 65/300 X |
| 4,043,254 | 8/1977 | Jaeger | 92/85 B |
| 4,098,597 | 7/1978 | Nebelung | 65/181 |
| 4,298,373 | 11/1981 | Mumford et al. | 65/260 |
| 4,351,663 | 9/1982 | Wood | 65/66 |

*Primary Examiner*—Arthur Kellogg
*Attorney, Agent, or Firm*—Arthur B. Moore

[57] ABSTRACT

A blow head which defines an upper portion of a mould cavity in which glass parisons are blown to the shape of mould cavity is moved into and out of operative position by a combination of horizontal and vertical movement. The vertical movement is brought about by a first piston and cylinder assembly (24, 26) and a second piston and cylinder assembly (38, 40) is operable, as the blow head approaches the parison, to oppose the action of the first piston and cylinder assembly (24, 26) thereby cushioning any impact between the blow head (4) and the parison.

7 Claims, 2 Drawing Figures

46
44
42
53
50
48
52
38
40
62
64
56
66
54
58
60
68
98
96
36
45
72
74
76
73
49
89
92
26
82
2
11
86
3
24
28
89
82
2
11
86
14
17
15
10
13
30
34
110
104
109
II
114
106
108
94
107
112
32
102
100
102
6
4
4
8
8
8

28
51
40
41
24
43
49
9
51
12
47
88
82
3
84
86
2
3
11
17
10
9
17
15
2
9
14
13
80
108
30
79
112
114
32
6
4
8

BLOW HEAD SUPPORTING AND MOVING MECHANISM OF A GLASSWARE FORMING MACHINE

TECHNICAL FIELD

This invention is concerned with a supporting and moving mechanism for a blow head of a glassware forming machine which is operable to blow air into glass parisons positioned in a mould cavity to cause them to expand and take up the shape of the mould cavity, the mechanism comprising a blow head support arranged to support a blow head which defines an upper portion of the mould cavity, a tube associated with the blow head support and arranged to enter a parison so that air can be blown through the tube into the parison, air supply means operable to supply air under pressure to the tube to be blown into a parison, and blow head support moving means operable to move the blow head support and blow head supported thereby between an operative position thereof in which the tube enters a parison in a mould cavity and an out-of-the-way position.

BACKGROUND ART

In many glassware forming machines, parisons of glass which have been moulded either by a blowing or by a pressing operation are placed in the mould cavity and air is blown into them to cause them to expand and take up the shape of the mould cavity. To supply the air to the parison, a blow head which closes the top of the mould cavity has a tube associated with it which is moved with the blow head and enters the parison so that air can be blown through the tube into the parison. The blow head and the tube are moved between an operative position in which the blow head closes the moulding cavity and the tube extends into the parison and an out-of-the-way position in which the glassware article can be removed from the mould cavity and a further parison introduced into the mould cavity. In many existing glassware forming machines, the movement of the blow head and the tube is achieved by a combination of vertical and rotary motion.

This combination of motions requires a complicated mechanism to ensure speed of movement and to cushion any impact between the blow head and the parison and/or the mould, cushioning of this impact being necessary to prevent damage occurring. Furthermore, the mechanism employed for cushioning this impact requires complicated adjustment when the size of the mould is to be changed.

It is an object of the present invention to provide an improved blow head supporting and moving mechanism of a glassware forming machine in which any impact between the blow head and parison is cushioned by means which does not require adjustment when the size of the mould is to be changed.

DISCLOSURE OF INVENTION

According to the invention, the blow head support moving means comprises horizontal moving means operable to move the blow head support horizontally into or out of vertical alignment with a parison, and vertical moving means operable to move the blow head support vertically into its operative position, the vertical moving means comprising a first piston and cylinder assembly operable to move the blow head support vertically, and a second piston and cylinder assembly operable, as the tube approaches the parison, to oppose the action of the first piston and cylinder assembly to thereby cushion any impact between the blow head and the parison.

In the interests of productivity, it is necessary that the blow head begins its return movement to its out-of-the-way position as soon as possible after the blowing of the article so that removal of the glassware article can take place. In order to achieve an early commencement of this return movement, it is preferred that the second piston and cylinder assembly is operative, when the blowing of the parison has been completed, to move the blow head support vertically away from the parison.

In order to enable the operative position of the blow head to be adjusted, it is preferred that the first piston and cylinder assembly has a piston rod which carries an abutment arranged to engaged the piston of the second piston and cylinder assembly as the tube approaches the parison, and the abutment is adjustable longitudinally along the piston rod.

BEST MODE OF CARRYING OUT THE INVENTION

Figure 1:
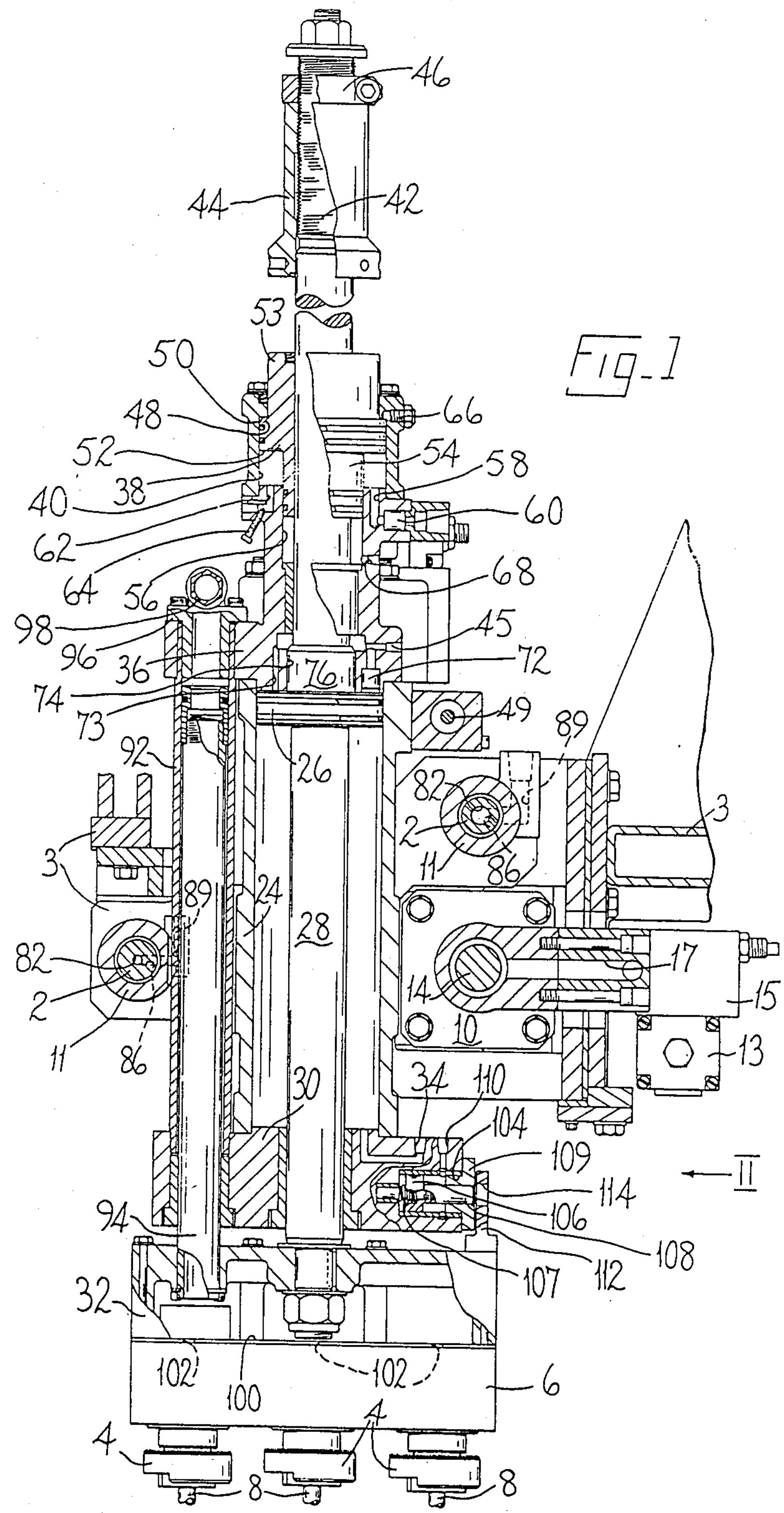
FIG. 1 is a vertical section taken through a blow head supporting and moving mechanism in accordance with the invention.

The blow head supporting and moving mechanism shown in the drawings forms part of a glassware forming machine and carries blow heads which are operable to blow air into glass parisons positioned in mould cavities of the machine to cause them to expand and take up the shape of the cavities. The mechanism is mounted on the framework 3 of the glassware forming machine above a blowing station of the machine at which the mould cavities are located. The mechanism is arranged to support three blow heads to blow air into three parisons simultaneously but in modifications of this mechanism a different number of blow heads may be supported.

The mechanism comprises two horizontal fixed slide rods 2 which are fixed to the framework 3 of the glassware forming machine and form a horizontal slideway on which horizontal motion of portions of the mechanism occurs. The mechanism comprises three blow head supports 4 which are mounted in a row on the underside of a block 6. These blow head supports 4 are each arranged to support a blow head (not shown) which defines an upper portion of the mould cavity and each has associated therewith a tube 8 carried by the block 6 which is arranged to enter a parison so that air can be blown through the tube 8 into the parison, when a blow head supported by the blow head support 4 is in engagement with a parison.

The mechanism also comprises blow head support moving means operable to move the blow head supports 4 and blow head supported thereby between an operative position thereof in which the tubes 8 enter parisons in the mould cavities and an out-of-the-way position. The movement of the blow head supports 4 is formed by a horizontal movement along the slide rods 2 and a vertical movement. To bring about the horizontal movement, the blow head support moving means comprises horizontal moving means and, to bring about the vertical movement, the blow head support moving means comprises vertical moving means. The horizontal moving means moves the blow head supports horizontally into or out of vertical alignment with parisons in the mould cavities and the vertical movement means moves the blow head supports vertically into their operative position. The horizontal moving means completes its operation before operation of the vertical moving means occurs and the vertical moving means completes its operation before further (return) movement of the horizontal moving means takes place.

The horizontal moving means comprises a piston and cylinder assembly comprising a cylinder 10 which is fixed on the framework 3 of the machine and a piston (not shown) which is movable in the cylinder 10 to move a piston rod 14. The piston rod 14 is fixed to a carriage 12 which is slideable horizontally on the slide rods 2 by the action of the piston and cylinder assembly. The carriage 12 comprises two side plates 9, a left hand (viewing FIG. 2) one of which is bolted to the piston rod 14. The plates 9 are inter-connected by two cylindrical sliders 11 each of which has one of the slide rods 2 passing centrally therethrough and is slideable along the slide rod 2. Operation of the piston and cylinder assembly is controlled by a valve 13 mounted on a manifold 15 which is in turn mounted on the side of the cylinder 10. The manifold 15 is connected to air passages 17 which extend to opposite ends of the cylinder 10 and enable air under pressure to be supplied to either side of the piston in the cylinder 10. In the operation of the mechanism, the blow head supports rest in an out-of-the-way position (shown in the drawings) in which the supports 4 are not in vertical alignment with the parisons. In order to bring the supports 4 into vertical alignment with the parisons, air under pressure is supplied to the cylinder 10 to the right of the piston therein (viewing FIG. 2) which causes the carriage 12 to move to the left. The movement of the carriage 12 to the left brings the blow heads supported by the supports 4 into vertical alignment with the parisons, the length of the stroke of the piston and cylinder assembly having been arranged to achieve this vertical alignment.

The vertical moving means of the blow head support moving means of the mechanism comprises a first piston and cylinder assembly operable to move the blow head supports 4 vertically. The first piston and cylinder assembly comprises a vertically-extending cylinder 24 mounted on the carriage 12 (see FIG. 1) and a piston 26 which is movable in the cylinder 24. A piston rod 28 extends upwardly and downwardly from the piston 26. Beneath the piston 26, the piston rod 28 passes through an end cap 30 of the cylinder 24 and is attached beneath the end cap 30 to a support 32 to the lower side of which the block 6, which carries the blow head supports 4, is attached. Thus, vertical movement of the piston 26 in the cylinder 24 causes the piston rod 28 to move vertically and the blow head supports 4 to be moved vertically. The end cap 30 defines an air passage 34 through which air can be introduced into the cylinder 24 beneath the piston 26 to cause vertical upwards movement of the blow head supports 4. Above the piston 26, the piston rod 28 passes through an upper end cap 36 of the cylinder 24 and then passes centrally through the piston 38 of a second piston and cylinder assembly of the vertical moving means. The second piston and cylinder assembly comprises a cylinder 40 mounted on top of the end cap 36 and the piston 38. Above the piston 38, the piston rod 28 has a screw-threaded portion 42 on which a threaded abutment 44 is received. The abutment 44 may be moved along the screw-threaded portion 42 of the piston rod 28 and then locked into position thereon by means of a locking collar 46 which provides locking means operable to lock the abutment 44 in its adjusted position on the piston rod 28. As will appear below, adjustment of the abutment 44 along the portion 42 alters the height of the operative position of the blow heads. The movement of the piston 26 in the cylinder 24 is controlled by valve 41 (FIG. 2) mounted on top of a manifold 43 mounted on the side of the cylinder 24 above the carriage 12. This valve 41 is operable to cause air under pressure to enter the air passage 34 or alternatively to enter the cylinder 24 above the piston 26 through an air passage 45. This air passes through the air passage 45 and into the cylinder 24 above the piston 26 when the valve 41 is operated by a plunger-operated valve 47 mounted on the cylinder 24. The valve 47 is operated by a plunger 49 thereof striking a stop 51 mounted on the framework 3. The plunger 49 is arranged to strike the stop 51 when the supports 4 come into vertical alignment with the parisons. Thus, when the carriage 12 has completed its horizontal movement, the first piston and cylinder assembly 24, 26 moves the supports 4 down to their operative position.

The piston 38 of the second piston and cylinder assembly 38, 40 is movable vertically in the cylinder 40 between limits set by engagement of an outer shoulder 48 of the piston 38 with an inner shoulder 50 of the cylinder 40, an upper portion 53 of the piston 38 projecting upwardly beyond the cylinder 40, and engagement of a lower shoulder 52 of the piston with the top of the end cap 36. The piston 38 has a downwardly-extending portion 54 which enters a recess 56 in the top of the end cap 36. The cylinder 40 has two air passages 58 and 62 connected to it through the end cap 36 so that they enter the cylinder beneath the shoulder 52 of the piston 38. A first of these air passages 58 contains a one-way valve 60 which allows air to enter the cylinder 40 through the air passage 58 but not to leave it therethrough. The second of these air passages 62 allows air to leave the cylinder 40 past a restrictor 64 mounted in the air passage 62. The portion of the cylinder 40 above the piston shoulder 48 and beneath the cylinder shoulder 50 is vented by an exhaust vent 66 and the recess 56 is vented by an air vent 68.

The air passage 45 in the end cap 36 connects through one-way valve 72 with the cylinder 24 above the piston 26 therein. The air passage 45 is also connected with a bleed hole 73 into the cylinder 24 and with the recess 74 in the end cap 36. The piston rod 28 passes through the recess 74 and an enlarged portion 76 of the piston rod 28 enters the recess 74 when this piston 26 approaches the end cap 36, the portion 76 being a close fit in the recess 74.

In the operation of the vertical moving means, air under pressure is supplied to the air passage 45 and passes through the one-way valve 72 into the cylinder 24 above the piston 26. The piston 26 then moves downwards in the cylinder 24 thereby moving the blow head supports 4 towards the parisons. Meanwhile air under pressure is supplied through the passage 58 to the cylinder 40 so that the piston 38 is maintained in an upper position thereof in which the shoulders 48 and 50 are in engagement with each other (see FIG. 1). A substantially constant air pressure is maintained in the cylinder 40 of the second piston and cylinder assembly 38, 40 throughout the operation of the mechanism, this constant pressure being supplied continuously to the air passage 58. The movement of a piston rod 28 downwards moves the abutment 44 downwards towards the piston 38. As the blow head supports 4 and the tubes 8 approach the parisons, the underside of the abutment 44 comes into contact with the upper side of the piston 38; this causes the piston 38 to be moved downwards in the cylinder 40 but this movement is opposed by the action of the piston and cylinder assembly 38, 40. The constant pressure air beneath the piston 38 serves to oppose the action of the assembly 24, 26 and air escapes from the cylinder 40 through the air passage 62 past the restrictor 64 to the source of constant pressure air to which the passage 62 is connected. The position of the abutment 44 on the piston rod 28 is adjusted so that when the movement of the piston 38 in the cylinder 40 is brought to a halt by engagememt with the end cap 36, the blow head supported by the blow head supports 4 are in position on the parisons and the tubes 8 are extending into the parisons so that blowing of the parisons can take place. Thus, for the last portion of the downward movement of the blow head supports 4 (equal to the stroke of the piston 38) towards the parisons, the movement is cushioned by the action of the piston and cylinder assembly 38, 40 and thus any impact between the blow heads and the parisons is also cushioned.

When blowing of the parisons has been completed, the air supply to the passage 45 is cut off by operation of the valve 41. At this point in the operation of the mechanism, air under pressure is still being supplied to the air passage 58 and the action of the piston and cylinder assembly 38, 40 causes the blow head supports 4 to be raised by a distance corresponding to the stroke of the piston 38 in the cylinder 40. The piston 38 raises the supports 4 by pressing up on the abutment 44. Thus, the second piston and cylinder assembly 38, 40 is operative, when blowing of the parisons has been completed, to move the blow head supports 4 vertically away from the parisons. This arrangement allows the mechanism to clear the parisons, which have now been blown into articles of glassware, as rapidly as possible. The movement occurs before air under pressure is supplied to the cylinder 24 through the air passage 34 when the action of the piston and cylinder assembly 24, 26 raises the supports 4 further.

When air under pressure is supplied to the passage 34, the piston 26 is moved upwardly in the cylinder 24 and the abutment 44 is raised clear of the piston 38 and returns to the position shown in FIG. 1. As the piston 26 approaches the end cap 36, the enlarged portion 76 enters the recess 74 thereby restricting the air flow from above the piston 26 to that air which passes through the bleed hole 73. Since the pressure above the piston 26 now builds up, the recess 74 and the enlarged portion 76 form cushioning means operable to cushion the end portion of the vertical movement of blow head supports 4 away from the parisons.

Figure 2:
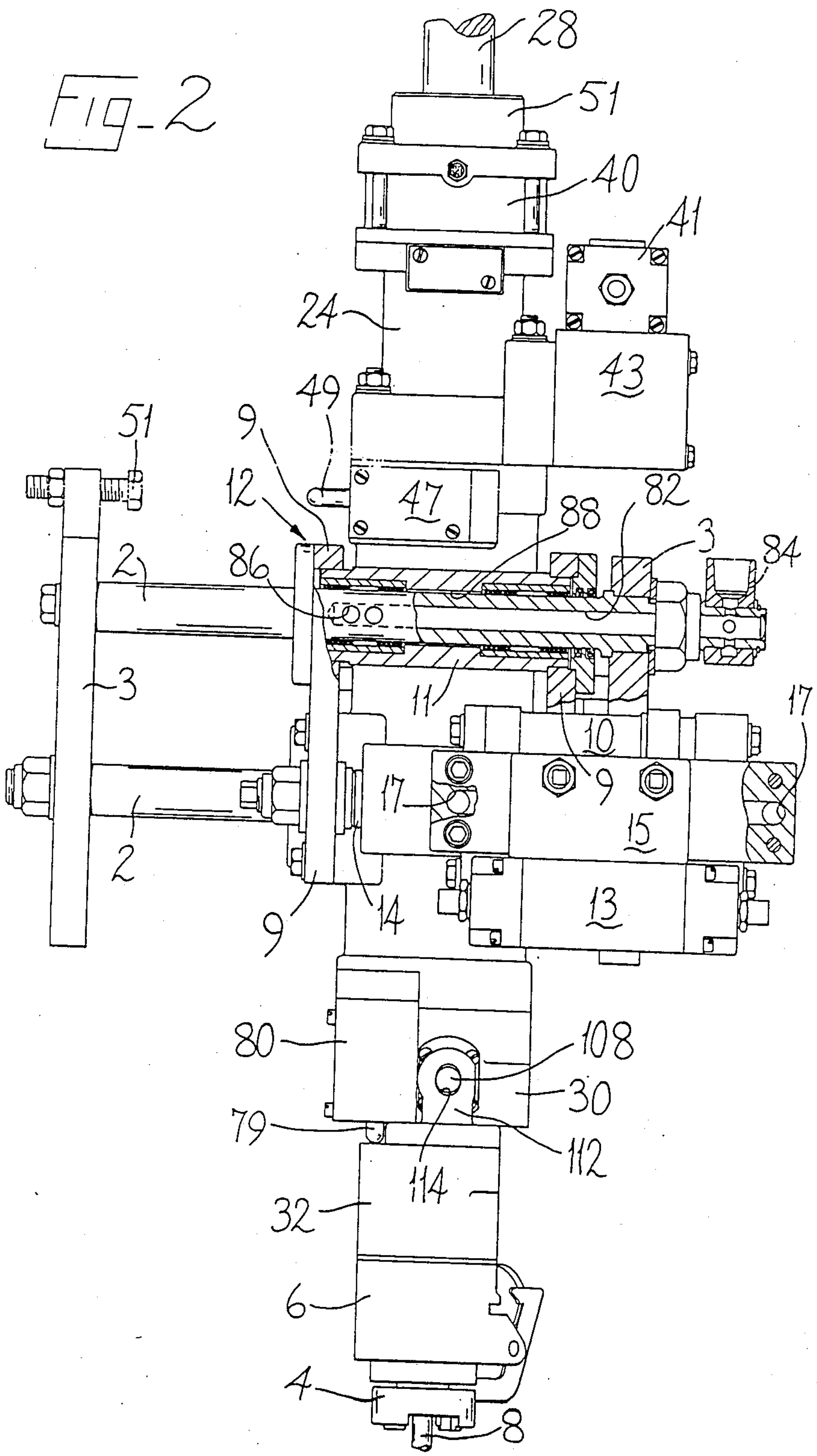
FIG. 2 is a side elevational view of the blow head supporting and moving mechanism, partly in section, taken in the direction of the arrow II.

When the piston 26 reaches its uppermost position, the support 32 engages the plunger 79 of a plunger-operated valve 80 mounted on the end cap 30 (FIG. 2). Operation of the valve 80, by engagement between the plunger 79 and the support 32, causes operation of the valve 13 so that air under pressure is supplied to the cylinder 10 so that the carriage 12 moves to the right (viewing FIG. 2), thereby returning to its former position (shown in FIG. 2).

The air supplies to the passages 34, 45, 58 and 62 enter the carriage 12 through the slide rods 2. Each of the slide rods 2 contains a central bore 82 which is connected to an air inlet 84 (one shown in FIG. 2) at the left hand (viewing FIG. 2) end of the rod 2. The bores 82 communicate through bores 86 with cylindrical spaces 88 surrounding the rods 2 within the sliders 11. Spaces 88 are sealed and communicate with the bores 86 in all positions of the carriage 12. The air supply to the cylindrical spaces 88 leaves through bores 89 in the carriage 12. One of the bores 89 carries an air supply which is supplied to the cylinders 24 and 40 while the other bore 89 carries a valve-piloting air supply. The connecting pipes between the various air passages, valves and bores are not shown in the drawings in the interests of clarity but it will be understood that most of these connections move bodily with the carriage 12 and hence do not need to be made flexible. It will thus be apparent that these connections are less susceptible to damage than would be the case if flexible connections were used.

In a modification of the mechanism shown in the drawings, the plunger-operated valves 47 and 80 are dispensed with and the operation of the piston and cylinder assemblies 24, 26 and 38, 40 is controlled by timed pulses of piloting air to the valves 13 and 41. In this modification, the operation of the piston and cylinder assembly 24, 26 can overlap than of the assembly 38, 40.

The mechanism shown in the drawings also comprises air supply means operable to supply air under pressure to the tubes 8 so that the air is blown into the parisons. The air supply means comprises a vertical tube 92 mounted on the outside of the cylinder 24 and a tube 94 which is mounted on the support 32 and extends upwardly therefrom through the end cap 30 and into the tube 92. The tubes 92 and 94 form a telescopic tube which extends as the supports 4 approach the parisons, since the tube 94 slides downwards within the tube 92, and the telescopic tube contracts as the support 4 moves away from the parisons. The upper end of the tube 92 is connected to a cap member 96 which is entered by a flexible pipe 98 through which air under pressure is supplied at appropriate times. The lower end of the tube 94 opens into a chamber 100 in the support 32 which is connected through holes 102 with the tubes 8.

The mechanism also comprises holding means operable to hold the blow head supports 4 in a position above their operative positions. The holding means is arranged to operate when the supply of air under pressure to the piston and cylinder assembly 24, 26 is removed so that the supports 4 and their associated parts do not fall under their own weight. The holding means is arranged to release the supports 4 when said supply of air is restored. The holding means comprises a cylindrical recess 104 in the side of the end cap 30 containing a piston 106 which is spring-urges out of the recess 104 by a spring 107. The piston 106 carries a locking pin 108 which passes through a cap 109 of the recess 104 and is urged inwardly of the recess 104 against the action of the spring 107 when air under pressure is supplied to the recess 104 between the cap 109 and the piston 106 through an air passage 110 in the cap 30. When the air supply to the assembly 24, 26 is removed, which will occur when the piston 26 is in its upper position, the air supply to the passage 110 is also removed and the pin 108 moves outwardly of the recess 104 into a slot 114 formed in a lug 112 on the support 32. Engagement between the pin 108 and the lug 112 locks the supports 4 in their upper position until the air supply to the passage 110 is restored.

It will be apparent that, once the abutment 44 has been adjusted to determine the operative position of the supports 4, the cushioning means provided by the piston and cylinder assembly 38, 40 does not require adjustment when the size of mould is changed.

I claim:

1. A blowhead mechanism for a glassware forming machine including a blowhead which is operable to blow air into a glass parison positioned in a mould cavity to cause it to expand and take up the shape of the mould cavity, said mechanism comprising vertical moving means operable to move said blowhead in a vertical direction, said vertical moving means including a first piston and cylinder assembly, said blowhead being connected to said piston, a second piston and cylinder assembly for opposing the action of said first piston and cylinder assembly as said blowhead approaches the mould cavity to cushion the first piston, means on the first piston to engage the second piston during the latter portion of the stroke of said first piston when said blowhead approaches the mold cavity, and means continuously supplying air pressure to said second piston and cylinder to urge said second piston in a direction opposite the direction of movement of said first piston as the blowhead moves toward the mold cavity, whereby, the second piston and cylinder assembly will cause the blowhead to move away from the mold cavity when the blowing has been completed and the air supply to the first piston and cylinder assembly is cut off.

2. A blowhead supporting and moving mechanism according to claim 1 characterised in that the first piston and cylinder assembly has a piston rod which carries an abutment arranged to engage the piston of the second piston and cylinder assembly as the blowhead approaches the mold cavity.

3. A blowhead supporting and moving mechanism according to claim 2 characterised in that the abutment is adjustable longitudinally along the piston rod.

4. A blowhead supporting and moving mechanism according to claim 3 characterised in that locking means is operable to lock the abutment in its adjusted position on the piston rod.

5. A blowhead supporting and moving mechanism according to claim 2 characterised in that the piston rod passes centrally through the piston of the second piston and cylinder assembly.

6. A blowhead supporting and moving mechanism according to claim 1 characterised in that holding means is operable to hold the blowhead in a position above its operative position, the holding means being arranged to operate when the supply of air under pressure to the first piston and cylinder assembly is removed and to release the blowhead when said supply is restored.

7. The blowhead mechanism of claim 1 further including horizontal moving means for moving said blowhead horizontally in a linear direction.

* * * * *